United States Patent

[11] 3,553,467

[72] Inventor: Charles W. Ramsey
Niles, Ohio
[21] Appl. No. 769,965
[22] Filed Oct. 23, 1968
[45] Patented Jan. 5, 1971
[73] Assignee: General Motors Corporation
Detroit, Mich.
a corporation of Delaware

[54] ROTATABLE SHUTTER MEANS HAVING LIGHT-BLOCKING PORTION WHEN STATIONARY
5 Claims, 5 Drawing Figs.

[52] U.S. Cl. .................................................. 250/233,
352/208, 350/273, 250/237
[51] Int. Cl. .................................................. G01d 5/32,
G02f 1/30, G03k 9/10
[50] Field of Search ........................................ 352/208,
220, 149; 250/233; 350/273

[56] References Cited
UNITED STATES PATENTS

| | | | |
|---|---|---|---|
| 1,609,961 | 12/1926 | Readeker | 352/149 |
| 1,680,756 | 8/1928 | Winter | 250/233X |
| 2,941,445 | 6/1960 | Kuhnert et al. | 352/208X |
| 3,237,509 | 3/1966 | Fielding | 250/233X |
| 3,244,878 | 4/1966 | Stein et al. | 250/227X |

*Primary Examiner*—Robert Segal
*Attorneys*—Warren D. Hill, Jean L. Carpenter and Paul Fitzpatrick ABSTRACT: A shaft rotation sensor includes a pair of shutters pivotally mounted on the end of a rotatable shaft each carrying colored light filters. A pair of pins on the shaft each engage a shutter to cause shutter rotation during shaft rotation. When the shaft is stationary one or both of the shutters swings down to intercept and filter the light beam. The light beam is picked up by a fiber optic light conductor which presents a colored illumination at a display station when the shaft is stationary.

PATENTED JAN 5 1971

3,553,467

INVENTOR.
Charles W. Ramsey
BY
Warren D. Hill
ATTORNEY

ROTATABLE SHUTTER MEANS HAVING LIGHT-BLOCKING PORTION WHEN STATIONARY

This invention relates to a device for monitoring a rotatable member and particularly for providing a visual signal indicative of whether the member is rotating.

It is often desirable to monitor the condition of rotation of a shaft in a machine such as a grain harvester so that the machine operator may be apprised immediately of a machine failure affecting shaft rotation. It has been the practice heretofore to use complicated rotation sensing devices requiring photocells, substantial electrical circuitry and the like. Such devices, however, are not only expensive to install and maintain but are also liable to failure, particularly during rugged service.

It is an object of this invention to provide a simple and reliable optical device for monitoring conditions of rotation and displaying a visual output reading at a location remote from the shaft.

It is another object of the invention to provide an optical shaft rotation monitor having a positive illuminated output indication whether the shaft is rotating.

The invention is carried out by providing a shutter device pivoted to a rotatable member at its axis of rotation which is adapted to interfere with a light beam intermittently when the rotatable member is rotating and uninterruptedly when the rotatable member is stationary.

The invention is further carried out by providing on rotatable shaft a pair of shutters pivoted with respect to the axis of shaft rotation and driving devices on the shaft for moving the shutters therewith during rotation and yet allowing at least one of the shutters to swing downwardly when the shaft is not rotating to interfere with a beam of light passing to a fiber optic light conductor which extends to a display station. The invention specifically contemplates that a translucent filter serves to provide the interference with the light beam.

The above and other advantages will be made more apparent from the following specification taken in conjunction with the accompanying drawings wherein like reference numerals refer to like parts and wherein.

Figure 1:
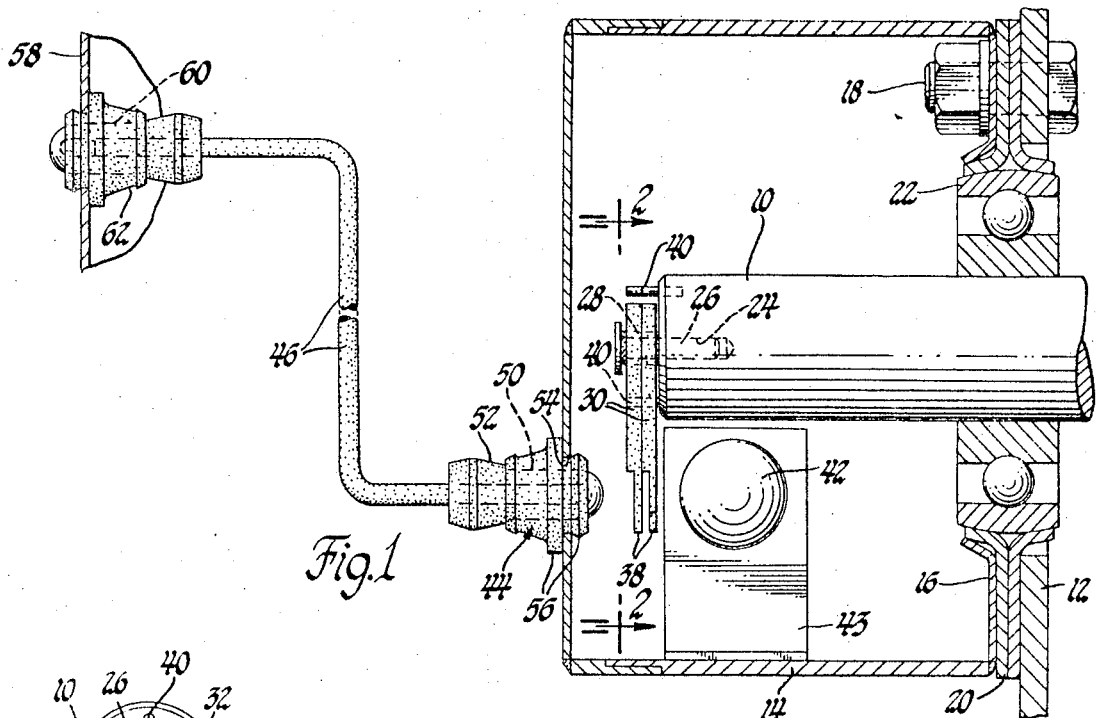
FIG. 1 is a view partly in cross section of a rotation sensing device according to this invention.
Figure 2:
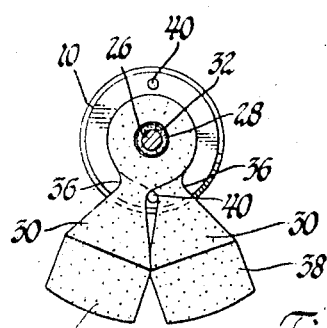
FIGS. 2, 3 and 4 are views taken along line 2–2 of FIG. 1 depicting alternate conditions of operation of the device.

Referring to FIG. 1, a shaft 10 whose rotation is to be monitored extends through an apertured wall 12. A cylindrical housing 14 having an end wall 16 with a central opening for receiving the shaft 10 is secured to the wall 12 by fasteners 18. A bearing support member 20 also secured to wall 12 by the fasteners 18 carries a bearing assembly 22 which rotatably supports the shaft 10. The end of the shaft 10 has a threaded bore 24 retaining a screw 26. A cylindrical spacer 28 around the screw 26 spaces the head of the screw 26 a fixed distance from the end of the shaft 10. A pair of shutters 30 having a combined thickness less than the length of the spacer 28 are pivotally mounted on the spacer 28 concentric with the axis of rotation of the shaft 10. As best seen in FIG. 2, each shutter 30 comprises an elongated keyhole-shaped piece of sheet material and contains an aperture 32 near one end slightly larger in diameter than the spacer 28 to allow free rotation of the shutter 30 about the spacer 28. The other end of each shutter 30 extends beyond the periphery of the shaft 10. The shutters 30 each have a narrow neck portion 36 near the center thereof. The shutters 30 may be made wholly of opaque material, however, it is preferred that they be made of a colored translucent material such as an acrylic plastic. The outer end of each shutter 30 includes a broad color filter portion 38 reduced in thickness so that a desired amount of light transmission can be achieved therethrough while maintaining adequate strength in the remainder of the shutters 30. In an alternative embodiment, not shown, the shutters 30 each comprise an opaque material such as steel carrying a translucent colored filter portion corresponding to the filter portion 38. A pair of pins 40 are secured to the end of the shaft 10 in diametrically opposed positions and extend into the paths of rotation of the shutters 30 so as to limit the amount of shutter rotation relative to the shaft 10. The pins 40 are located to engage the neck portions 36 of the shutters 30 so as to separate the shutters 30 and prevent them from completely overlapping yet allowing the filter portions 38 to overlap slightly when the shaft 10 is in the position as shown in FIG. 2 with the pins 40 vertically aligned.

Figure 3:
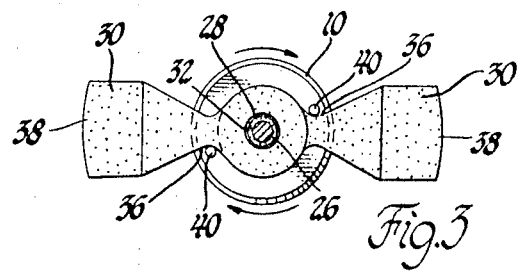
Figure 4:
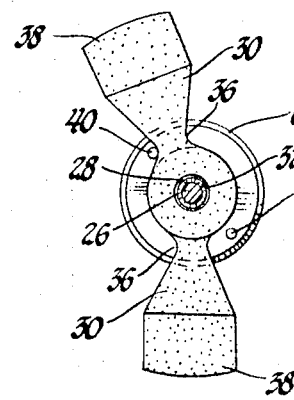

As shown in FIG. 3, when the shaft 10 rotates, the pins 40 drivingly engage the shutters 30 at their neck portions 36 so that the shutters 30 rotate with the shaft 10. However, when the shaft 10 stops at least one of the shutters 30 as shown in FIG. 4 will fall by gravity to its lowermost position to extend below the shaft 10. In the event that the shaft 10 stops with the pins 40 vertically aligned as shown in FIG. 2, then both the shutters 30 will fall down as far as permitted by the lower pin 40 and by virtue of the thin neck portions 36 the shutters 30 will overlap slightly.

Referring again to FIG. 1, a lamp 42 is mounted on a support 43 within the housing 14 directly underneath the shaft 10. A light pickup 44 is mounted in a wall of the housing 14 opposite the lamp 42 and on the other side of the shutters 30 so that the shutters 30 form means for interfering with the passage of light between the lamp 42 and the light pickup 44. The light pickup 44 receives light from the lamp 42 to the extent that the shutters 30 do not interfere with light transmission to the pickup 44. The light pickup 44 includes the end of a fiber optic light conductor 46 which is inserted within a collector lens 50. An adapter 52 of resilient material envelopes the collector lens 50 and secures the collector lens 50 within an aperture 54 in the housing 14 by means of a pair of opposed resilient flanges 56 engaging the edges of the aperture 54. The opposite end of the light conductor 46 extends to an apertured display panel 58 remote from the shaft 10. At the display panel 58 the light conductor 46 terminates within a display lens or jewel 60 which is retained within an aperture of the display panel by an adapter 62 similar to the adapter 52.

In operation, the lamp 42 is continuously illuminated by an electrical source, not shown. When the shaft 10 is rapidly rotating, the shutters 30 similarly rotate and interfere with the light passing to the light pickup 44 to an insignificant extent. The light is conducted to the remote display panel 58 to illuminate the lens or jewel 60. Apparent steady illumination of the lens 60 will occur so long as the rotation of the shaft 10 exceeds about 100 r.p.m. since the interruptions by the shutters 30 are imperceptible at such high speeds. In the event the shaft 10 assumes a lower speed of rotation, particularly below 50 r.p.m., then the periodic interruption of the light by the shutters 30 will be clearly perceptible to the viewer of the lens 60. Thus the viewer or operator will be alerted to the slowing down of the shaft 10 which normally rotates at a high speed. In the event that the shaft rotation ceases altogether, one or both of the shutters 30 will fall down below the shaft 10 and will consequently interfere with the light passing to the light pickup 44 and to the lens 60 to render an uninterrupted colored output signal. If it is desired to use shutters 30 which are entirely opaque, then the shutters 30 will, of course, completely block passage of light the lens 60 when the shaft 10 is stationary. However, shutters 30 having a translucent colored filter portion 38 are preferred since they will result in a positive output signal when the shaft 10 is stationary and the absence of illumination of the lens 60 will be indicative of a failure of the lamp 42.

Figure 5:
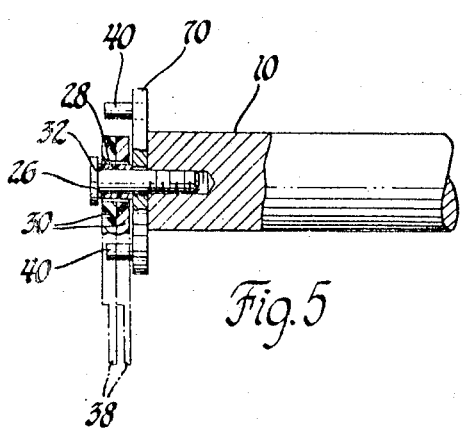
FIG. 5 is a partial view of another embodiment of a rotation sensing device according to the invention.

FIG. 5 illustrates an alternative structure which is useful where the shaft 10 is too small in diameter to accommodate the pins 40 or where it is otherwise not convenient to secure the pins 40 directly to the shaft 10. There an adapter plate 70 carrying the pins 40 is secured to the end of the shaft 10 by the screw 26 and the spacer 28. In all other respects, this embodiment is identical to the one of FIGS. 1–4.

I claim:

1. Means for monitoring the rotation of a rotatable member comprising a light source, a light pickup spaced from the light source and arranged to receive light therefrom, and means for interfering with the passage of light to the light pickup comprising:

shutter means including a pair of shutters freely pivotally mounted on the axis of rotation of said rotatable member, each shutter of said pair moving during nonrotation of said rotatable member to a position determined by gravity, at least one of said positions being between said light source and said light pickup;

and positive drive means fixed on the rotatable member for effecting during rotation of the shutter means at a fixed angular position relative to the rotatable member independent of the velocity of rotation;

each shutter having a portion which during rotation traverses a path between the light source and the light pickup and which when the rotatable member is stationary remains between the light source and the light pickup regardless of the rest position of the rotatable member; and whereby the shutter means intermittently interferes with the passage of light to the light pickup during rotation of the rotatable member and uninterruptedly interferes with such passage of light when the rotatable member is stationary.

2. Means for monitoring the rotation of a rotatable member comprising a light source, a light pickup spaced from the light source and arranged to receive light therefrom, and means for interfering with the passage of light to the light pickup comprising:

shutter means including a pair of shutters freely pivotally mounted on the axis of rotation of said rotatable member, each shutter of said pair moving during nonrotation of said rotatable member to a position determined by gravity, at least one of said positions being between said light source and said light pickup;

and positive drive means fixed on the rotatable member for effecting during rotation of the member positive rotation of the shutter means at a fixed angular position relative to the rotatable member independent of the velocity of rotation;

each shutter having a translucent colored filter portion which during rotation traverses a path between the light source and the light pickup and which when the rotatable member is stationary remains between the light source and the light pickup regardless of the rest position of the rotatable member; and whereby the shutter means intermittently filters the light passing to the light pickup during rotation of the rotatable member and uninterruptedly filters the light when the rotatable member is stationary.

3. Means for monitoring the rotation of a rotatable member comprising a light source, a conductor having one end spaced from the light source and arranged to receive light therefrom, the other end of the light conductor being secured at a display panel, and means for interfering with the passage of light to the light conductor comprising:

shutter means including a pair of shutters freely pivotally mounted on the axis of rotation of said rotatable member, each shutter of said pair moving during nonrotation of said rotatable member to a position determined by gravity, at least one of said positions being between said light source and said light pickup, and positive drive means fixed on the rotatable member for effecting during rotation of the member positive rotation of the shutter means at a fixed angular position relative to the rotatable member independent of the velocity of rotation;

each shutter having a colored filter portion which during rotation traverses a path between the light source and the light conductor and which when the rotatable member is stationary remains between the light source and the light conductor regardless of the rest position of the rotatable member; and whereby the colored filter portion intermittently filters the light passing to the light conductor during rotation of the rotatable member and uninterruptedly filters the light when the rotatable member is stationary.

4. Means for monitoring the rotation of a rotatable shaft comprising:

a light source mounted below the rotatable shaft;

a fiber optic light conductor having one end mounted below the shaft and spaced from the light source and arranged to receive light therefrom, the other end of the light conductor being secured at a display station remote from the shaft; and means for interfering with the passage of light to the light conductor including a pair of shutters freely pivotally mounted on the shaft at the axis of rotation thereof and means for driving the shutter to rotate with the shaft during shaft rotation, the shutters each having a portion which during rotation traverses a path between the light source and the light conductor;

the means for driving the shutters including a pair of pins secured to the shaft at opposite sides of the axis of rotation and extending between the shutter, so that during shaft rotation the shutters intermittently pass between the light source and the light conductor and when the shaft is stationary in any angular position at least one shutter remains between the light source and the light conductor; and whereby the condition of illumination of the light conductor at the display station is dependent on the condition of shaft rotation.

5. Means for monitoring the rotation of a rotatable shaft comprising:

a light source mounted below the rotatable shaft;

a fiber optic light conductor having one end mounted below the shaft and spaced from the light source and arranged to receive light therefrom, the other end of the light conductor being secured at a display station remote from the shaft;

means for filtering the light passing to the light conductor including a pair of shutters freely pivotally mounted on the shaft at the axis of rotation thereof and means for driving the shutters to rotate with the shaft during shaft rotation, the shutters each having a colored translucent filter portion which during rotation traverses a path between the light source and the light conductor;

the means for driving the shutters including a pair of pins secured to the shaft at diametrically opposite sides of the axis of rotation and extending between the shutters, so that during shaft rotation the filter portions intermittently pass between the light source and the light conductor and when the shaft is stationary in any angular position at least one filter portion remains between the light source and the light conductor; and whereby only light colored by a filter portion is received at the display station when the shaft is stationary.

PO-1050
(5/69)

UNITED STATES PATENT OFFICE
CERTIFICATE OF CORRECTION

Patent No. 3,553,467                    Dated   January 5, 1971

Inventor(s)   Charles W. Ramsey

It is certified that error appears in the above-identified patent and that said Letters Patent are hereby corrected as shown below:

Column 2, line 74, after the last sentence of the specification and before the claims insert the following paragraph:

-- The embodiments of the invention described herein are for purposes of illustration and the scope of the invention is intended to be limited only by the following claims: --

Column 3, line 13, Claim 1, after "rotation" insert -- of the member positive rotation --; line 20 delete "and"; Claim 2, line 47, delete "and";

Column 4, Claim 3, line 9, delete "and"; Claim 4, line 36, delete "and", Claim 5, line 62, delete "and".

Signed and sealed this 20th day of April 1971.

(SEAL)
Attest:

EDWARD M. FLETCHER, JR.                WILLIAM E. SCHUYLER, JR.
Attesting Officer                      Commissioner of Patents